Jan. 4, 1949.  D. W. MAIN  2,458,088
COUPLING
Filed Dec. 29, 1945
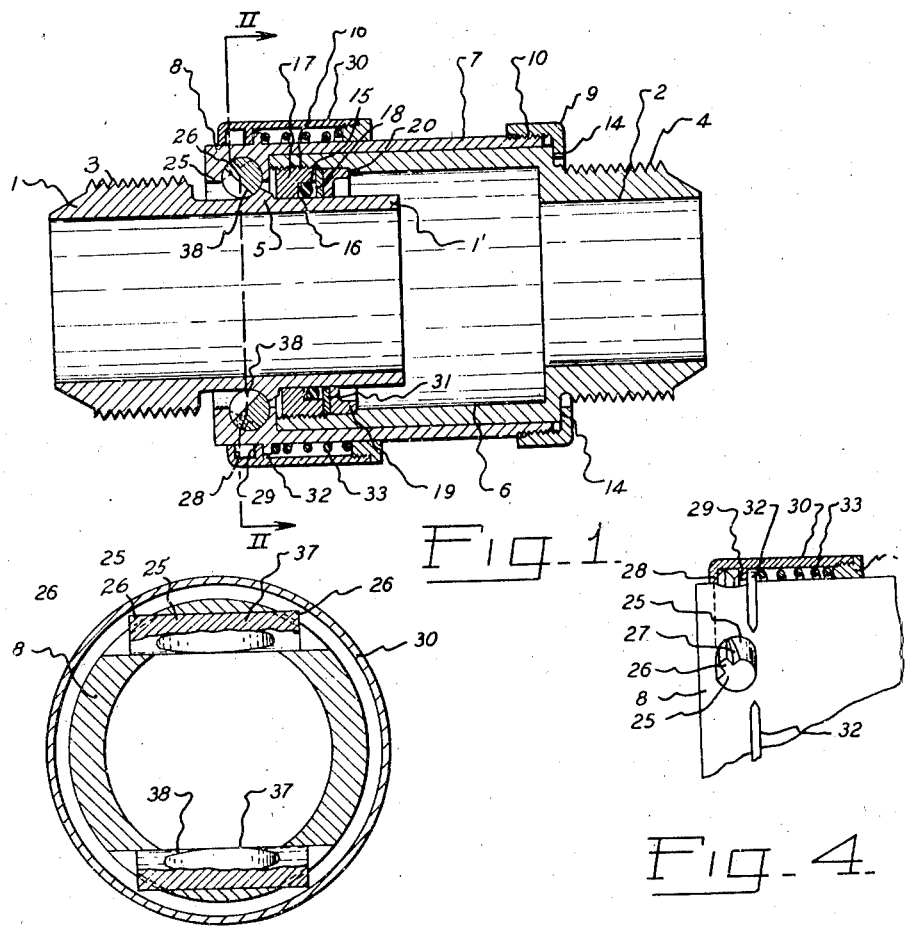
Fig-1.
Fig-2.
Fig-4.
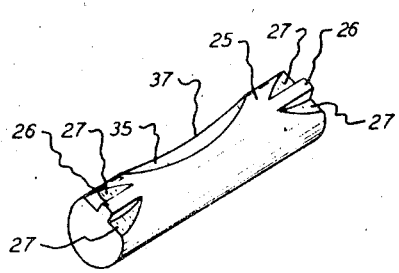
Fig-3.
Inventor
DONALD W. MAIN
By Beaman & Larry Jorel
Attorneys Patented Jan. 4, 1949

2,458,088

UNITED STATES PATENT OFFICE 2,458,088

COUPLING

Donald W. Main, Jackson, Mich., assignor, by mesne assignments, to Aeroquip Corporation, Jackson, Mich., a corporation of Michigan Application December 29, 1945, Serial No. 637,807

5 Claims. (Cl. 285—169)

The present invention relates to a coupling and more particularly to a quick connecting and disconnecting coupling for tubular members.

In the art of tube couplings it is desirable to have means for providing quick connecting and disconnecting which is positive in operation and yet holds the parts in sealing relation. The present invention provides a coupling, the parts of which when brought together, snap into locking relation.

According to the present invention, it is an object to provide a snap-action coupling.

Another object of the invention is to provide a coupling which has a positive lock.

Still another object of the invention is to provide a coupling of the character described wherein a fluid seal is obtained and maintained by a positive latch.

A further object of the invention is to provide a coupling of the character described wherein a simple releasing lock permits the disconnecting of the coupling.

A still further object of the invention is to provide a coupling of the character described, having a novel latch mechanism.

These and other objects residing in the arrangement, combination and construction of the parts will be apparent from the following specification when taken with the accompanying drawing, in which Fig. 1 is a vertical section of the invention, Fig. 2 is a section on the line II—II of Fig. 1, Fig. 3 is an elevational view of the catch for the latch, and Fig. 4 is a partial section of a detail showing the relation of the latch and catch to each other.

Referring particularly to the drawing, an entering portion 1 is associated with a receiving portion 2. The portions 1 and 2 are provided with threaded portions 3 and 4 for attachment to suitable other hose or pipe terminating arrangements.

The entering portion 1 is provided with a tubular portion 1' having thereon intermediate its ends an annular boss 5. It will be understood that instead of employing an annular boss 5, there may be provided as many discontinuous bosses as there are catches, to be hereinafter described, on the receiving portion 2.

The receiving portion 2 is provided with a tubular extension 6 of larger diameter than the receiving portion 2. The tubular extension 6 has telescopically arranged, on the outside thereof, a sleeve 7 which is provided with a ring 8 overlapping the end of the tubular member 6. The ring 8 is urged into clamping engagement with the end of tubular member 6 by a nut 9, threaded to a threaded end 10 of the sleeve 7 and overlapping a shoulder 14 of the receiving portion 2.

A seal between the receiving portion 2 and the tubular member 6 is provided by a resilient ring 15 of normally circular cross-section and conventionally known as an O ring. The flexible ring 15 may be of any suitable material such as artificial rubber and of any suitable consistency permitting the same to flex under the pressure of escaping fluid thereagainst, although other equivalent types of sealing rings may be employed. The sealing ring 15 is disposed in a cavity 16 formed by an undercut edge of a ring 17 threaded into the inside of the outer end of the tubular member 6. The ring 17 is screwed against a washer 18 bearing against a member 19 in turn bearing against a shoulder 20 in the inner surface of the tubular member 6. The member 19 is for the purpose of supporting a self-sealing structure not a part of this invention and not further disclosed.

The annular boss 5 comprises a latch and serves to hold the entering portion 1 and receiving portion 2 together when it is disposed behind a "catch" 25. The catch 25 is in the form of a rod shown particularly in each of the figures of the drawing and is mounted for rotation in the ring 8 on the end of the sleeve 7. At each end of the catch 25 is disposed a nub 26 which preferably is formed by milling away a portion of the catch 25 providing notches 27 as shown particularly in Fig. 3. The catch 25 and the notches 27 are so arranged in the ring 8 as to project the nub 26 outwardly from the periphery of the ring 17 and into association with opposed shoulders 28 and 29 carried by a sleeve 30 telescoped on the outer surface of the sleeve 7. The sleeve 30 is provided at the end opposite the shoulders 28 and 29 with an abutment ring 31. Adjacent the shoulders 28 and 29 on the sleeve 7 is a boss 32. The boss 32 is annular except for broken out parts at points where the catch 25 projects outwardly as shown in Fig. 4. A helical spring 33 disposed about the sleeve 7 and beneath the sleeve 30, bears at one end against the abutment ring 31 and at the other end against the boss 32 so as to resiliently urge the shoulders 28 and 29 to the right as viewed in Fig. 1. Motion to the right causes the shoulder 28 to engage the nubs 26 causing the catch 25 to rotate in a clockwise direction as viewed in Fig. 1. A central portion of the catch 25 is cut away so as to provide a passage having a shoulder 37 for the purpose of permitting the free passage of the boss 5 under conditions hereinafter explained.

There is provided an additional catch 38 identical in structure and operation with the catch 25 opposite the catch 25. It is to be understood, however, that the number of catches may be one, two, or any other desired number.

The operation of the invention is as follows:

The catch 25 and the catch 38 are normally held with the shoulder 37 in inclined position as shown in Fig. 1, by the action of the spring 33 urging the shoulder 28 against the nubs 26. When the tube 1 of the entering portion 1' is inserted into the receiving portion 2, the boss 5 engages the inclined shoulder 37 camming the same to rotate the catch 25 in a counterclockwise direction. This action causes a compression of the spring 33 due to the nubs 26 bearing against the shoulder 28. As soon as the boss 5 passes the shoulder 37, the resiliency of the spring 33 causes the catch 25 to rotate in a clockwise direction as heretofore explained to present the outer surface of the catch 25 against the following side of the boss 5 to retain the entering portion 1 against displacement from the receiving portion 2. Thus the entering portion 1 and the receiving portion 2 are positively latched together. When it is desired to disconnect the entering portion 1 and the receiving portion 2, it is merely necessary to slide the sleeve 30 on the sleeve 7 to the left as viewed in Figs. 1 and 4, to cause the shoulder 29 to bear against the nubs 26 to rotate the catch 25 in a counter-clockwise direction to move the shoulder 37 into a horizontal position as viewed in Fig. 1, to permit the escape of the boss 5 past the catch 25. In describing the operation of the invention, it is, of course, understood that the catch 38 and other catches if they are provided, function in the same manner as the catch 25 and are released in the same manner.

While the invention has been described for use with pipes or tubes, it will be understood that it is equally applicable to solid bars if desired. The form of the invention disclosed embodies a receiving portion 2 made up of several separate parts, including the tube 6, sleeve 7, ring 8, nut 9, ring 17 and member 19. It is contemplated that they may be made as a single piece. It will also be understood that while I have described one embodiment of the invention, other embodiments falling within the scope of the following claims are contemplated.

Having thus described my invention, what I desire to secure by Letters Patent and claim is:

1. A coupling of the character described comprising a receiving portion and an entering portion, said portions being adapted to be moved into telescoping relation, a latch on the outer surface of said entering portion, a yieldable catch on said receiving portion in the path of said latch upon the telescoping of said portions, said catch yielding to the passage of said latch upon telescoping movement of said portions in a coupling direction but positively resisting movement of said latch in a return direction, said catch comprising a bar having a locking shoulder and mounted for axial rotation, and spring means for resiliently biasing said bar rotationally to dispose said shoulder in a predetermined latch locking position.

2. A coupling as claimed in claim 1 wherein said yieldable catch is transversely rotatable in said receiving portion, and means is disposed exteriorly of said receiving portion for releasing said latch means.

3. A coupling as claimed in claim 1 comprising spring latch means, and annular means disposed telescopically on one of said portions for releasing said latch means.

4. A coupling as claimed in claim 1 comprising means to resiliently urge said catch into operative relation to said latch, said means being manually operable to move said catch out of operative relation to said latch.

5. The invention as defined in claim 4 wherein the catch has a portion extending outwardly of said receiving portion, and wherein the means for yieldingly actuating said catch is mounted on the outside of said receiving portion.

DONALD W. MAIN.

REFERENCES CITED

The following references are of record in the file of this patent:

UNITED STATES PATENTS

| Number | Name | Date |
|---|---|---|
| 2,069,434 | Eastman | Feb. 2, 1932 |
| 2,255,333 | Scheiwer | Sept. 9, 1941 |
| 2,344,740 | Shaff | Mar. 21, 1944 |